(12) United States Patent
Han et al.

(10) Patent No.: US 10,365,734 B2
(45) Date of Patent: Jul. 30, 2019

(54) CLICKABLE CONTROL PAD

(71) Applicant: Home Control Singapore PTE. LTD., Singapore (SG)

(72) Inventors: Fei Han, Jiangsu (CN); Ching Guan Tay, Singapore (SG); Beng Tee Peh, Singapore (SG); Whye Kwong Liang, Singapore (SG)

(73) Assignee: HOME CONTROL SINGAPORE PTE. LTD., Singapore (SG)

( * ) Notice: Subject to any disclaimer, the term of this patent is extended or adjusted under 35 U.S.C. 154(b) by 88 days.

(21) Appl. No.: 15/535,328

(22) PCT Filed: Dec. 22, 2015

(86) PCT No.: PCT/SG2015/000144
§ 371 (c)(1),
(2) Date: Jun. 12, 2017

(87) PCT Pub. No.: WO2016/114715
PCT Pub. Date: Jul. 21, 2016

(65) Prior Publication Data
US 2017/0329426 A1    Nov. 16, 2017

(30) Foreign Application Priority Data

Jan. 16, 2015    (WO) ............... PCT/CN2015/070868

(51) Int. Cl.
*G06F 3/0354* (2013.01)
*G06F 3/02* (2006.01)
*G06F 3/044* (2006.01)
*G06F 3/0362* (2013.01)

(52) U.S. Cl.
CPC ........ *G06F 3/03547* (2013.01); *G06F 3/0202* (2013.01); *G06F 3/0362* (2013.01); *G06F 3/044* (2013.01)

(58) Field of Classification Search
CPC .... G06F 3/03547; G06F 3/0202; G06F 3/044; G06F 3/0362; G06F 3/0354; G06F 3/02
See application file for complete search history.

(56) References Cited

U.S. PATENT DOCUMENTS

| | | |
|---|---|---|
| 2010/0300772 A1 | 12/2010 | Lee et al. |
| 2010/0328234 A1 | 12/2010 | Lu |
| 2011/0191516 A1* | 8/2011 | Xiong ..................... G06F 13/14 710/305 |
| 2011/0221665 A1* | 9/2011 | Yoon ...................... G08C 17/02 345/156 |
| 2012/0261243 A1* | 10/2012 | Yokoyama .......... G06F 3/03547 200/600 |

(Continued)

OTHER PUBLICATIONS

International Search Report and Written Opinion of International Application No. PCT/SG2015/000144 "Clickable Control Pad," dated Feb. 16, 2016.

(Continued)

*Primary Examiner* — Vinh T Lam
(74) *Attorney, Agent, or Firm* — Hamilton, Brook, Smith & Reynolds, P.C.

(57) ABSTRACT

A clickable control pad, comprising a top part (101), a frame (103), and a mechanical structure (101a, 103b) for guiding a movement of the top part (101) with regard to the frame (103) in a direction perpendicular to the frame (103).

5 Claims, 3 Drawing Sheets

Cantilever

(56) References Cited

U.S. PATENT DOCUMENTS

2014/0211396 A1    7/2014  Shiroishi
2014/0306911 A1*  10/2014  Zadesky ............... G06F 3/0338
                                                        345/173
2015/0022960 A1*   1/2015  Doi ....................... G06F 1/1616
                                                        361/679.08

OTHER PUBLICATIONS

International Preliminary Report on Patentability for International Application No. PCT/SG2015/000144 "Clickable Control Pad" dated May 1, 2017.

* cited by examiner

CLICKABLE CONTROL PAD

RELATED APPLICATION(S)

This application is the U.S. National Stage of International Application No. PCT/SG2015/000144, filed Dec. 22, 2015, which designates the U.S., published in English, and claims priority under 35 U.S.C. §§ 119 or 365(c) to PCT/CN2015/070868, filed Jan. 16, 2015. The entire teachings of the above applications are incorporated herein by reference.

FIELD OF THE INVENTION

The invention relates to a clickable control pad, such as a clickable touchpad or trackpad.

BACKGROUND OF THE INVENTION

Touchpads are common in computing devices and accessories, like notebooks and Apple Air Mouse. Recently, touchpads are getting popular in remote control devices to control consumer electronics appliances. Touchpads allow mouse cursor navigation and selecting an application and executing a command, e.g. by single or double taps on the touchpad. A clickable button is also common and user-friendly for the same purpose. A conventional clickable button is separate from touchpad, as in most notebooks. A state-of-the-art clickable touchpad integrates the clickable button with touchpad, as seen in Apple Magic Mouse, Apple MacBook Air/Pro and Sony Remote Control. A touchpad integrated with buttons enable additional functions to be added into limited touchpad area. This result in a compact design including buttons besides touch, tap and click gestures.

A prior art clickable touchpad uses a hinge mechanism in which the touchpad hinges on one side and actuates a switch on the bottom side of the touchpad when a user clicks the touchpad. A hinge mechanism has the disadvantage of different click feeling depending on where the user clicks on the top side of touchpad.

US2013/0155017A1 describes a capacitive sensing device with flexure mechanisms to allow "non-uniform displacement". This means movement includes a rotational component, not just a translational component.

SUMMARY OF THE INVENTION

It is, inter alia, an object of the invention to provide a clickable control pad in which movement is guided into a desired direction (e.g. vertical if the clickable control pad is in a horizontal position). The invention is defined by the independent claims. Advantageous embodiments are defined in the dependent claims.

One aspect of the invention provides a remote control device comprising a clickable control pad, comprising a top part, a frame, and a mechanical structure comprising a plurality of cooperating boss-hole combinations the holes allowing for uniform perpendicular sliding movement of the whole of the top part with respect to the plane of the frame and a plurality of resilient cantilevers or springs to assert upwards force to push the top part during clicking wherein the arrangement of the cantilevers or springs and the boss-hole combinations are not concentric, and the plane of the cantilevers when they store their maximum amount of potential energy is perpendicular to the plane of the mouth of a hole of the boss-hole combinations.

An embodiment of this invention overcomes prior art limitations by providing an even click feeling when a user clicks on any location on the top side of touchpad. Now it is possible to add unlimited number of buttons on the clickable touchpad.

An embodiment of this invention overcomes the uneven click feeling and also overcomes distracting clicking noise due to position and angle when actuating the switch on the under-side of touchpad, An embodiment of this invention provides a firm and assuring feeling when releasing the click movement.

These advantages in this invention give a premium perception and better acceptance by a user towards offering of touch-enabled handheld devices, such as remote control devices.

Another embodiment of this invention includes wireless two-way communication link between a remote control device and controlled devices (host). The link allows the host to display contextual menu and guides for the user to use relevant functions with finger movements and gestures on the touch-enabled top part of the remote control device. The intuitive finger and eyes reception in coordination with the host's response overcomes the "head banging" experience; where a user has to move the head up to look at the screen, and down to the remote control device to locate the keys, which the user suffers from using conventional remote control even with both prior art constructions discussed above.

Another embodiment includes sound (using buzzer) and haptic (motor) for sensorial feedback to create seamless control experience with the host.

These and other aspects of the invention will be apparent from and elucidated with reference to the embodiments described hereinafter.

DESCRIPTION OF EMBODIMENTS

Figure 1:
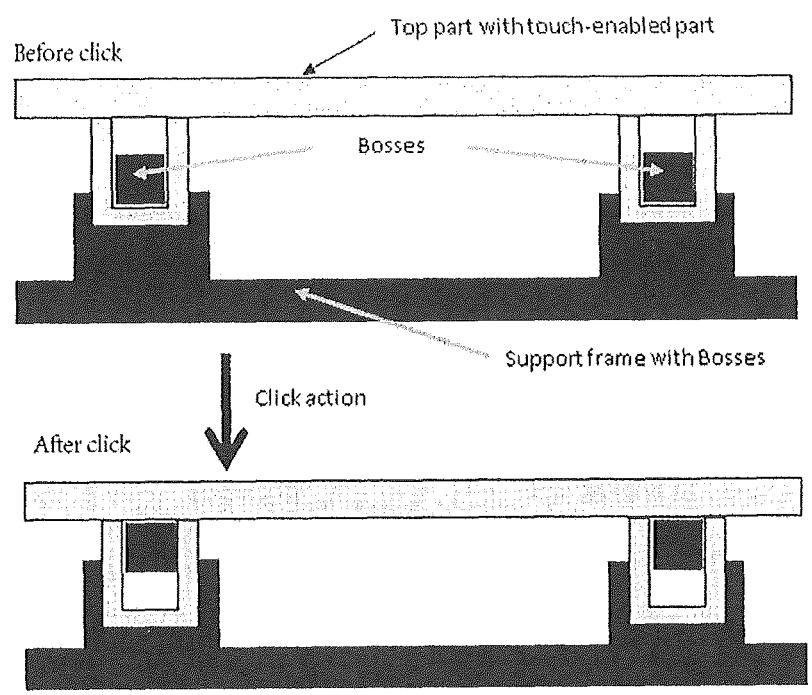
FIG. 1 illustrates how a vertical movement is achieved in accordance with an embodiment of the invention.

The embodiment shown in FIG. 1 allows for a uniform vertical movement, as a result of the bosses and holes. This allows vertical movement of the whole top part uniformly to actuate a tactile switch. Thereby, a see-saw effect as in the prior art is taken away.

Figure 2:
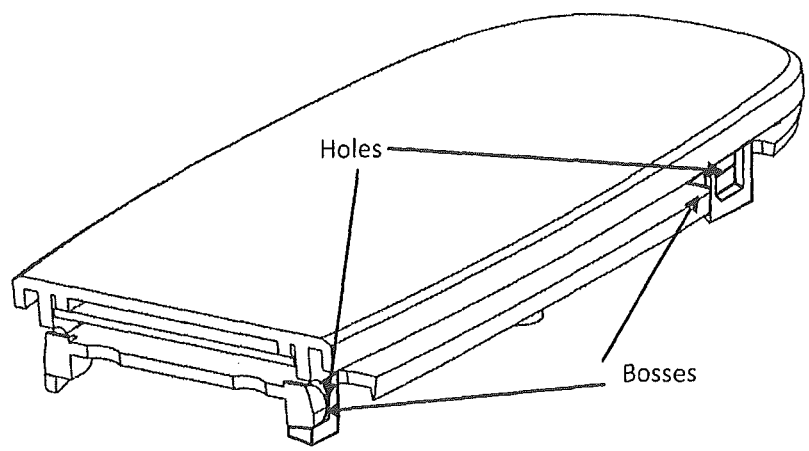
FIG. 2 shows a top part with rectangle-shaped holes, and a matching frame with bosses in accordance with an embodiment of the invention.

The embodiment of FIG. 2 has a touch-enabled top part and a frame. Top part has 4 rectangle-shaped holes and aligned to 4 boss structures on the frame. The holes allow sliding movements vertically & uniformly when the top part is pressed downwards during clicking.

Figure 3:
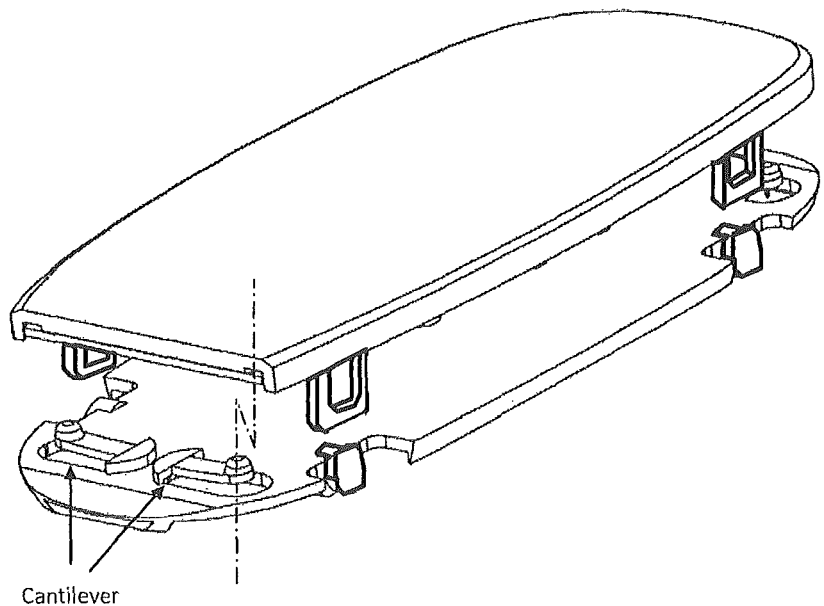
FIG. 3 shows a frame with cantilevers in accordance with an embodiment of the invention.

The embodiment of FIG. 3 uses cantilever(s) on the frame to support touch-enable top part, stacked On top of the frame. The number of cantilevers depends on factors such as top part size and force needed to depress the lever during clicking. In this embodiment, 4 cantilevers are used. The frame has 4 boss structures to provide contact surface around 4 corresponding holes on the top part. During clicking, the cantilevers deform and exert a return force.

During release, the cantilever pushes the top part upwards and recovers to its form. The boss and rectangle-shaped holes and cantilevers provide uniform click feeling that overcomes the disadvantages using hinge mechanism on one side and construction described in US2013/0155017A1 (Rehn et al.).

Figure 4:
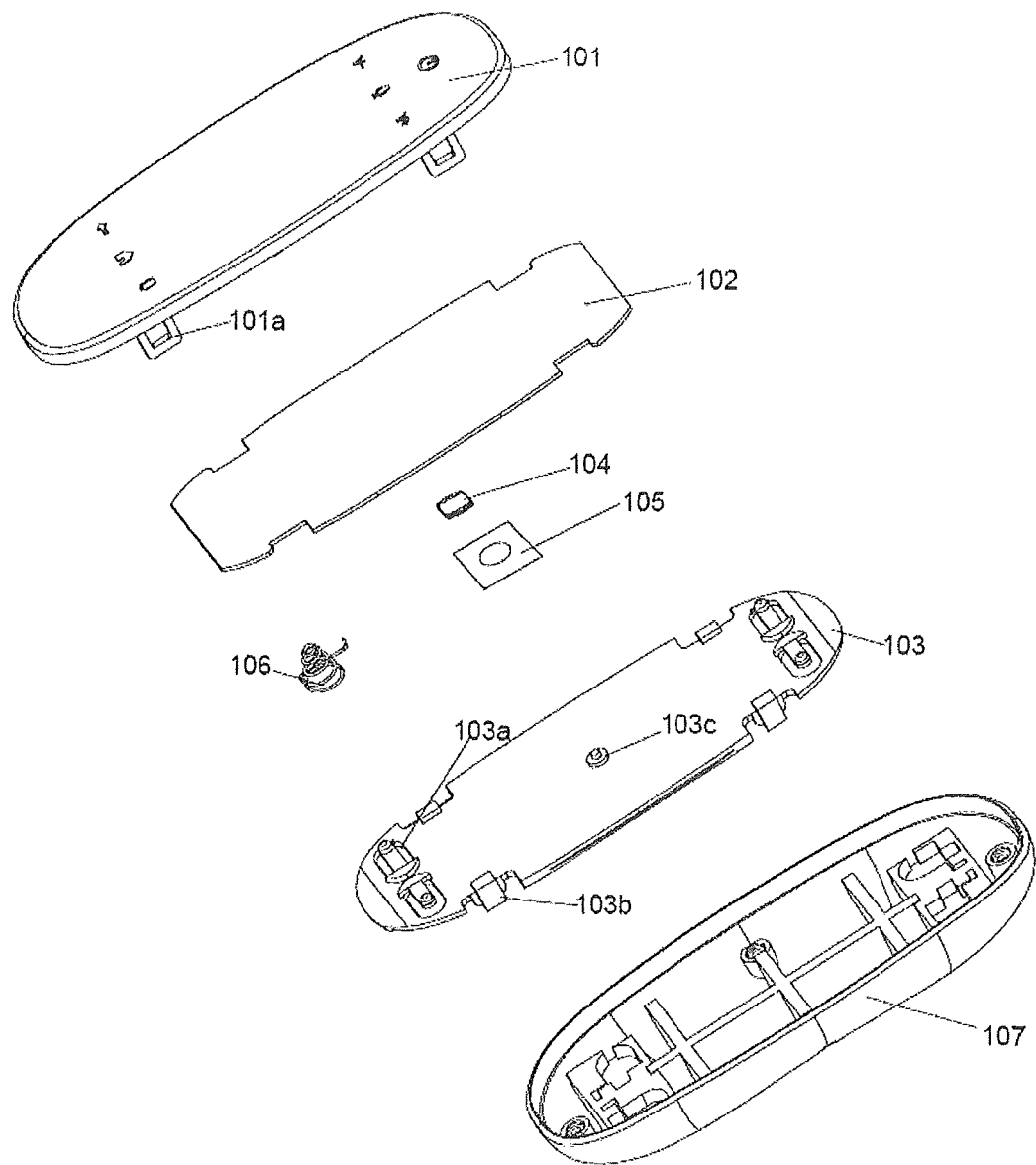
FIG. 4 shows an exploded view of an embodiment of the invention.

The embodiment of FIG. 4 comprises 6 parts: top part 101, Printed Circuit Board (PCB) 102, switch 104, rubber mat 105, frame 103 and bottom part 107. Top part 101 has 4 rectangle-shaped holes 101a and aligned to 4 boss structures 103b on frame 103. The holes allow sliding movements vertically & uniformly when top part 101 is pressed downwards during clicking. There are 4 cantilevers 103a on the frame 103 which will assert an upwards force to push the top part 101 during clicking. When, released, top part 101 moves upward and is stopped by the 4 boss structures 103b guiding the holes.

In another embodiment, metal springs 106 are used in place of the cantilevers 103a to support during release and exert upwards force during clicking.

Switch 104 is actuated closed and opened by plunger 103c formed by boss with shoulder on the frame 103, when top part 101 moves downwards and upwards during clicking and releasing. In this invention, a metal dome is used as switch 104. The switch 104 is mounted on the underside of PCB 102 or above frame 105. Other switch, mounting and actuation embodiments will be apparent to those of skill in the art.

A rubber mat 105 is sandwiched between switch 104 and plunger 103c to overcome loud clicking noise.

A bottom part 107 provides support to this invention and acts as body of the remote control device.

In this embodiment, actuating switch 104 generates electrical signal to circuitry during clicking and provides tactile feeling as well. The electrical signal is then used to effect an action for the remote control device, e.g. firing a code wirelessly to a host. In another embodiment, actuating switch 104 provides tactile feeling only during clicking. Electrical signal during clicking is generated from top part 101 with a touch sensor having force-sensing capability or z-direction sensing.

This embodiment includes a top part 101 that is of anon-conductive material (e.g. plastic) with a PCB 102 beneath. The capacitive touch sensor is designed on metallized layer of the PCB 102. The top part 101 and PCB 102 are held together with adhesive to ensure, uniform capacitive sensing and to reduce clicking noise. In another embodiment, a touch sensor layer (e.g. ITO) is sandwiched between top part 101 and PCB 102. It is apparent to those of skill in the art to fix the PCB 102 to the frame 105 instead. The touch-enabled top part 101 can be either with capacitive touch sensors covering the full top part area or only a part of top part 101 (example, middle section only), depending on the metallized layer sensor design on the PCB 102.

In another embodiment, the rectangle-shaped holes 101a and boss structures 103b can be implemented using catches design. Alternatively, pins in the top part 101 could move in pipes in the frame 103 to ensure a movement of the top part 101 that is perpendicular to the frame 103; in yet another alternative, the top part 101 could be provided with pipes while the frame 103 would have pins.

The invention is applicable to remote control devices, human machine interface control panels, computing devices and accessories with clickable function, e.g. mouse, touchpad on notebooks and remote control devices with touch-enabled features.

The invention is advantageously applied in a remote control system comprising a remote control device comprising a clickable control pad, and a consumer electronics device having or coupled to a display device, the consumer electronics device being controlled by the remote control device, the consumer electronics device being arranged for showing on the display device a cursor controlled by the remote control device, wherein a command for the consumer electronics device is given by a user pressing the top part of the clickable control pad. The consumer electronics device may be e.g. a TV set that itself has a display, or e.g. a set-top box or recording device not having itself a display but coupled to a TV set having a display. The cursor may be a traditional cursor (e.g. arrow-shaped), but may alternatively be a highlighted portion of e.g. a virtual keyboard that is displayed on the display screen, with the highlighted portion being a virtual key on the virtual keyboard at a position that corresponds to a position of a user's finger on the control pad. If a user then clicks on the clickable control pad at a position corresponding to the position of that virtual key, the virtual key is virtually pressed, resulting in e.g. a character being typed or a broadcast station being selected. In this way, the user does not have to look at his remote control device: he can just watch the display screen, as movements of his finger on the remote control device will be represented by things happening on the display screen. This application is advantageously distinguished from that of U.S. Pat. No. 6,765,557 as that prior art document does not show a clickable touchpad: in the prior art, an operator uses the touch pad to highlight a selected portion of display screen, and the operator then uses control buttons to select the highlighted portion of display screen. As a result, in the prior art, the user still has to move his finger away from the touchpad to press a real key (not a virtual key) on the remote control device, so that he still needs to look down at the remote control device and then look up again at the display.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

What is claimed is:

1. A remote control system with a virtual keyboard, comprising:
   a remote control device comprising a clickable control pad; and
   a consumer electronics device having or coupled to a display device, the consumer electronics device being controlled by the remote control device, the consumer electronics device being arranged for showing on the display device the virtual keyboard, wherein the virtual keyboard is navigated by finger movements on a top part of the clickable control pad, and each of a plurality of virtual keys is selected by pressing the top part of the clickable control pad at a position corresponding to the selected virtual key;
   the clickable control pad being formed of:

the top part covered at least in part by a plurality of capacitive touch sensors;

a frame;

a mechanical structure comprising at least four cooperating boss-hole combinations, the holes allowing for uniform perpendicular sliding movement of the whole of the top part with respect to a plane of the frame, wherein the boss-hole combinations are located along an outer periphery of the frame;

a plurality of resilient cantilevers or springs to assert an upwards force to push the top part during clicking; and a switch that is actuated when the top part is pressed towards the frame.

2. The system as claimed in claim 1, wherein each respective hole of the boss-hole combinations is formed by a presence of a respective continuous frame, at least a portion of which is adapted to act as a stop member to both connect the top part to the frame and to prevent further upward movement of the top part beyond a certain point after an upwards force on the top part has been asserted.

3. The system as claimed in claim 1, wherein movement of the primary plane of the top part relative to a primary plane of the frame when it occurs, is adapted to be parallel movement.

4. The system as claimed in claim 1, wherein each respective hole of the boss-hole combinations is formed by a presence of a respective continuous frame, at least a portion of which is adapted to act as a stop member to both connect the top part to the frame and to prevent further upward movement of the top part beyond a certain point after an upwards force on the top part has been asserted.

5. The system as claimed in claim 1, wherein each boss is connected to the frame and each hole forms part of the top part.

* * * * *